United States Patent [19]
Rathweg et al.

[11] Patent Number: 6,092,754
[45] Date of Patent: Jul. 25, 2000

[54] BUCKLER FOR A TAPE DRIVE

[75] Inventors: Christopher Rathweg, LaFayette; Sheldon Helms, Longmont, both of Colo.

[73] Assignee: Quantum Corporation, Milpitas, Calif.

[21] Appl. No.: 09/276,330

[22] Filed: Mar. 25, 1999

Related U.S. Application Data

[63] Continuation-in-part of application No. 09/149,759, Sep. 8, 1998, Pat. No. 5,971,310.

[51] Int. Cl.$^7$ ...................................................... G03B 1/38
[52] U.S. Cl. ................... 242/332.4; 242/338; 242/532.1; 242/532.6; 242/532.7; 242/582
[58] Field of Search ................................ 242/352.4, 338, 242/532.1, 532.6, 532.7, 582

[56] References Cited

U.S. PATENT DOCUMENTS

| | | |
|---|---|---|
| 4,110,774 | 8/1978 | Krehbiel et al. . |
| 4,330,096 | 5/1982 | Bartel et al. . |
| 4,335,858 | 6/1982 | Cranna ................. 242/332.4 |
| 4,572,460 | 2/1986 | Hertrich . |
| 4,577,811 | 3/1986 | Bray et al. . |
| 4,608,614 | 8/1986 | Rinkleib et al. . |
| 4,646,177 | 2/1987 | Sanford et al. . |
| 4,662,049 | 5/1987 | Hertrich . |
| 4,720,913 | 1/1988 | Hertrich . |
| 4,832,284 | 5/1989 | Inoue . |
| 5,046,168 | 9/1991 | Ohsaki . |
| 5,219,129 | 6/1993 | Spicer et al. . |
| 5,303,875 | 4/1994 | Hoge et al. . |
| 5,374,003 | 12/1994 | Hoge et al. . |
| 5,443,220 | 8/1995 | Hoge et al. . |
| 5,542,620 | 8/1996 | Ohshita . |
| 5,673,155 | 9/1997 | Motoyama et al. ................ 242/338 X |
| 5,769,346 | 6/1998 | Daly . |
| 5,857,634 | 1/1999 | Hertrich ........................... 242/332.4 X |
| 5,971,310 | 10/1999 | Saliba et al. ......................... 242/332.4 |
| 5,979,813 | 11/1999 | Mansbridge et al. ................ 242/332.4 |

FOREIGN PATENT DOCUMENTS

| | | |
|---|---|---|
| 1547015 | 10/1969 | Germany . |
| 716632 | 10/1954 | United Kingdom . |
| 1167445 | 10/1969 | United Kingdom . |

*Primary Examiner*—Donald P. Walsh
*Assistant Examiner*—Minh-Chau Pham
*Attorney, Agent, or Firm*—Steven G. Roeder

[57] ABSTRACT

An improved tape drive is provided herein. The tape drive includes a cartridge receiver and a buckler. The cartridge receiver receives a cartridge having a cartridge leader. The buckler selectively retains a drive leader of the tape drive. The tape drive and cartridge include an improved buckle which securely couples the drive leader of the tape drive to the cartridge leader of the cartridge. As provided herein, the buckler includes a pair of spaced apart buckler retainers which selectively engage a buckle bar of the drive leader. The buckler selectively moves the buckle bar relative to the cartridge leader to couple the drive leader to the cartridge leader.

25 Claims, 15 Drawing Sheets

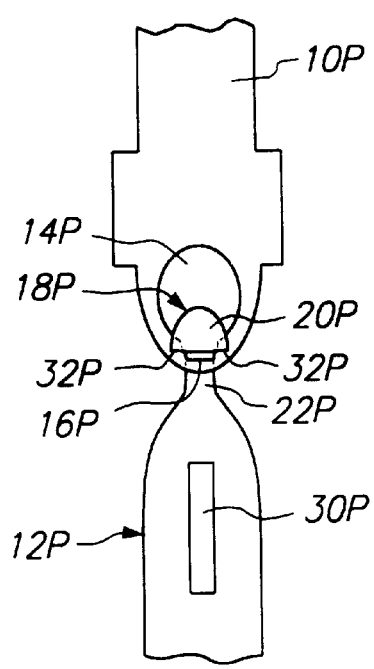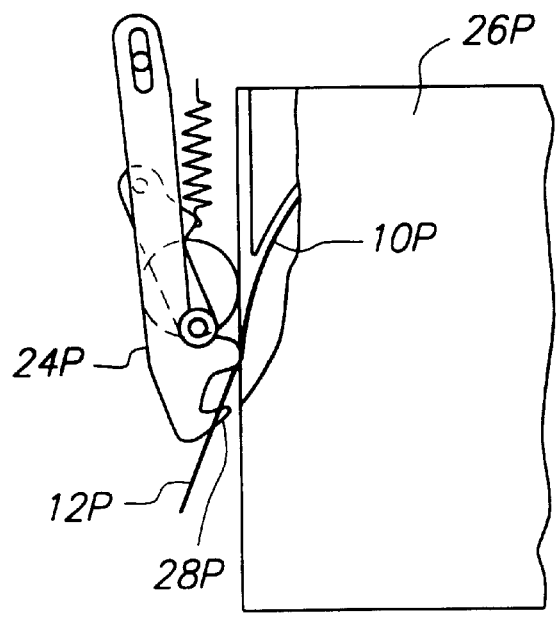
FIG. 1A
(PRIOR ART)
FIG. 1B
(PRIOR ART)

4,092,754

BUCKLER FOR A TAPE DRIVE

REFERENCE TO RELATED APPLICATION

This Application is a Continuation-In-Part of U.S. application Ser. No. 09/149,759, filed on Sep. 8, 1998 now U.S. Pat. No. 5,971,310, and entitled "Positive Engagement Buckle For A Tape Drive and Cartridge", which is currently pending. The contents of U.S. application Ser. No. 08/149,759, are incorporated herein by reference.

FIELD OF THE INVENTION

The present invention relates generally to tape drives and cartridges which use a storage tape to store and transfer data. More specifically, the present invention relates to a tape drive having an improved buckler for buckling and unbuckling a cartridge leader on the storage tape to a drive leader of the tape drive.

BACKGROUND

Tape drives are widely used for storing information in digital form. These tape drives commonly use a storage tape having a thin film of magnetic material which receives the information. Typically, the storage tape is moved between a pair of spaced apart reels, past a data transducer to record or read back information from the storage tape.

In one type of tape drive system, one of the reels is part of the tape drive, while the other reel is part of a removable cartridge. For this type of tape drive system, the reel which is a part of the tape drive is commonly referred to as a take-up reel, while the reel which is a part of the cartridge is commonly referred to as a cartridge reel. With this system, upon insertion of the cartridge into the tape drive, it is necessary to couple the storage tape on the cartridge reel to the take-up reel of the tape drive. Subsequently, the storage tape must be uncoupled from the take-up reel, prior to removing the cartridge from the tape drive system.

Typically, a cartridge leader on the storage tape is automatically coupled to a drive leader which is connected to the take-up reel during insertion of the cartridge into the tape drive. The procedure of connecting the drive leader with the cartridge leader is commonly referred to as "buckling" or "coupling". Subsequently, during ejection of the cartridge, the cartridge leader is unbuckled from the drive leader.

FIG. 1A illustrates a prior art cartridge leader 10P coupled to a prior art drive leader 12P. In this prior art embodiment, the cartridge leader 10P includes a hoop 14P and a notch 16P, while the drive leader 12P includes a mushroom shaped tab 18P having a nose 20P and a neck 22P. The hoop 14P is dimensioned to enable the nose 20P and neck 22P of the drive leader 12P to pass therethrough. The notch 16P is dimensioned to receive the neck 22P, but prevent the nose 20P from passing therethrough.

FIG. 1B illustrates a prior art buckler 24P which automatically couples the prior art cartridge leader 10P of a cartridge 26P to the prior art drive leader 12P. With this system, the prior art buckler 24P has a single, finger type hook 28P which fits into a drive leader aperture 30P (illustrated in FIG. 1A) in the drive leader 12P. The buckler 24P selectively rotates to couple and uncouple the drive leader 12P to the cartridge leader 10P. Commonly assigned U.S. Pat. Nos. 4,662,049 and 4,720,913 provide a tailed discussion of this type of tape buckling arrangement.

Unfortunately, this type of tape buckling arrangement is not completely satisfactory. More specifically, the drive leader 12P can become unbuckled from the cartridge leader 10P before the cartridge leader 10P has been pulled nto the take-up reel. This is commonly referred to as "leader runaway". During leader runaway, the drive leader 12P can retract onto the take-up reel and the cartridge leader 10P can retract into the cartridge 26P.

One cause of leader runaway is a loss of tension in leaders 10P, 12P before the cartridge leader 10P is pulled onto the take-up reel. During a loss of tension, the nose 20P can slip up into the hoop 14P and become disengaged from the notch 16P. Another cause of leader runaway is excessive use of the tape drive. More specifically, the prior art leaders 10P, 12P are each made of plastic. After excessive use, edges 32P of the nose 20P of the tab 18P begin to weaken. During usage, the weakened edges 32P can deflect and allow the tab 18P to pass through the notch 16P.

Another type of buckling arrangement utilizes a robotic arm to grab a block secured to the end of the storage tape. Subsequently, the robotic arm moves the block along the tape path and inserts the block into a slot in the take-up reel of the disk drive. Unfortunately, this type of buckling arrangement is relatively large, complicated and expensive to manufacture.

In light of the above, it is an object of the present invention to provide an easy and accurate way to reliably couple and de-couple a storage tape of a cartridge to a take-up reel of a tape drive. Another object of the present invention is to provide an improved buckler and buckle for a tape drive. Yet another object of the present invention is to provide a tape drive which is compatible with prior art cartridges. Still another object of the present invention is to provide a tape drive system having a buckler and buckle which are relatively easy and cost efficient to manufacture and utilize.

SUMMARY

The present invention is directed to a tape drive which satisfies these objectives. The tape drive includes an improved buckler which couples a drive leader of the tape drive to a cartridge leader of a cartridge. As provided in detail below, the buckler allows for the use of a unique buckle which solidly couples the cartridge leader to the drive leader. This reduces the possibility of leader runaway and improves the durability of the disk drive.

The buckle includes a bar shaped, buckle bar, a first bar receiver and a second bar receiver. The buckle bar is secured to the drive leader and extends transversely across the drive leader. The buckle bar has a first bar section and a spaced apart second bar section which cantilever away from the edges of the drive leader. The first bar receiver and the second bar receiver are spaced apart and secured to the cartridge leader. Each bar receiver is sized and shaped to receive a portion of one of the bar sections to couple the drive leader to the cartridge leader.

The buckler selectively retains and moves the drive leader to couple drive leader to the cartridge leader. In one embodiment, the buckler includes a pair of spaced apart buckler retainers. Each buckler retainer is adapted to selectively engage one of the bar sections of the buckle bar. Additionally, the buckler can include a buckler tab which interacts with a fixed buckler stop to move the buckler away from the drive leader and outside of the path of the storage tape. This minimizes the chances of the buckler damaging the storage tape.

The present invention is also a method for buckling a drive leader of a tape drive to a cartridge leader of a cartridge. The method includes the steps of providing a tape drive including a cartridge receiver and a drive leader and moving a buckler to couple the drive leader to a cartridge leader of a cartridge.

Importantly, the buckler and buckle provided herein enhance buckling reliability between the cartridge leader and the drive leader. This reduces the possibility of leader runaway. Additionally, the durability of the buckler and buckle is significantly improved.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1A is a top plan view of a coupled, prior art cartridge leader and drive leader;

FIG. 1B is a top plan view of a prior art buckler and a portion of a prior art cartridge;

DESCRIPTION

Figure 2:
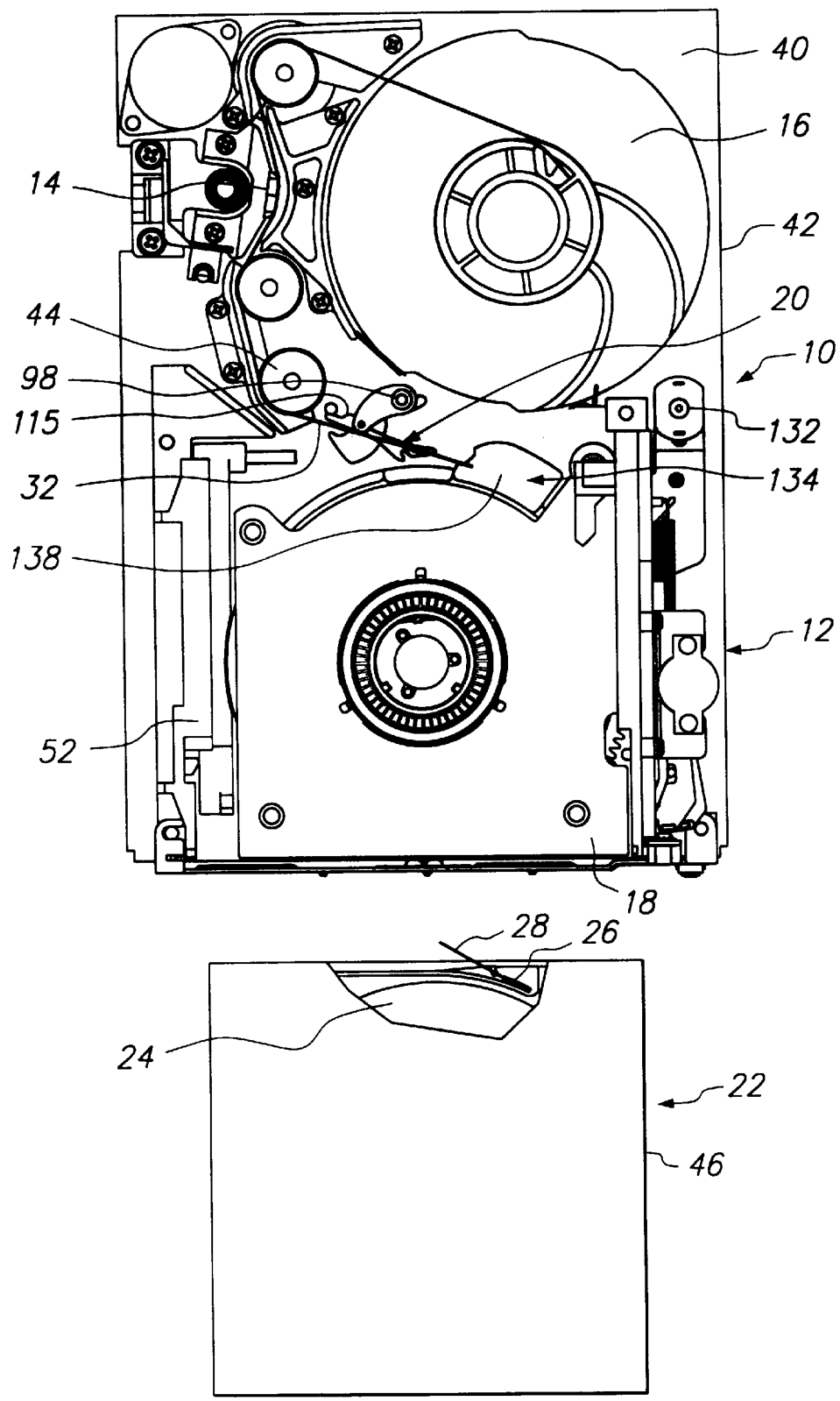
FIG. 2 is a top plan view of a portion of a tape drive and a cartridge, in partial cut-away, having features of the present invention.

Referring initially to FIG. 2, a tape drive 10 having features of the present invention includes a drive housing 12, a data transducer 14, a take-up reel 16, a cartridge receiver 18, and a buckler 20. The tape drive 10 is designed for use in conjunction with a cartridge 22 including a cartridge reel 24 and a storage tape 26 having a cartridge leader 28. A buckle 30 (illustrated in FIGS. 5A–6B) secures a drive leader 32 of the tape drive 10 to the cartridge leader 28. As provided in detail below, the buckler 20 moves the drive leader 32 relative to the cartridge leader 28 to automatically couple and uncouple the buckle 30 to attach the drive leader 32 to the cartridge leader 28.

Figure 3:
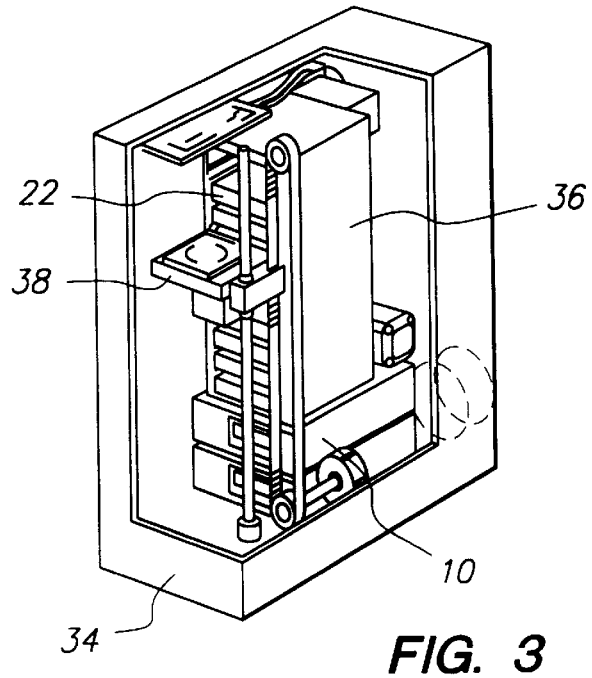
FIG. 3 is a perspective, partly cut-away view of a tape library having features of the present invention.

The tape drive 10 is typically installed within a computer (not shown), or a word processor (not shown). Alternately, the tape drive 10 can be utilized as part of a tape library 34. In the embodiment illustrated in FIG. 3, the tape library 34 includes a plurality of cartridges 22 which are retained in a multiple cartridge magazine 36, a robotic cartridge handler 38 and a pair of tape drives 10. The robotic cartridge handler 38 selectively retrieves one of the cartridges 22 from the cartridge magazine 36 and places the cartridge 22 within one of the tape drives 10. A suitable tape library 34 is sold under the trademark DLTstor™, by Quantum Corporation.

A detailed description of the various components of a tape drive 10 is provided in U.S. Pat. No. 5,371,638, issued to Saliba, and assigned to Quantum Corporation, the Assignee of the present invention. The contents of U.S. Pat. No. 5,371,638 are incorporated herein by reference. Accordingly, only the structural aspects of the tape drive 10 which are particularly significant to the present invention are provided herein. A representative tape drive 10 is sold by Quantum Corporation, the Assignee of the present invention under the trademark DLT™4000.

The drive housing 12 retains the various components of the tape drive 10. The drive housing 12, illustrated in FIG. 2, includes a base 40, four spaced apart side walls 42 and a cover (not illustrated in FIG. 2 for clarity). The tape drive 10 includes a plurality of tape rollers 44 for guiding the storage tape 26 past the data transducer 14 and onto the take-up reel 16.

The storage tape 26 stores data in a form that can be subsequently retrieved if necessary. A magnetic storage tape 26 is commonly used to store data in digital form. For conservation of space, the storage tape 26 has a tape width of preferably at least approximately one-half an inch (0.5 in). Alternately, for example, the storage tape 26 can have a tape width of between approximately four millimeters to eight millimeters (4.0 mm–8.0 mm). The storage tape 26 includes a storage surface on one side of the storage tape 26 for storing data. The storage surface is divided into a plurality of tracks (not shown). Each track can be a linear pattern which extends the length of the storage tape 26. Alternately, for example, the data can be recorded in diagonal strips across the storage tape 26. The storage tape 26 is initially retained on the cartridge reel 24 of the cartridge 22.

Figure 4:
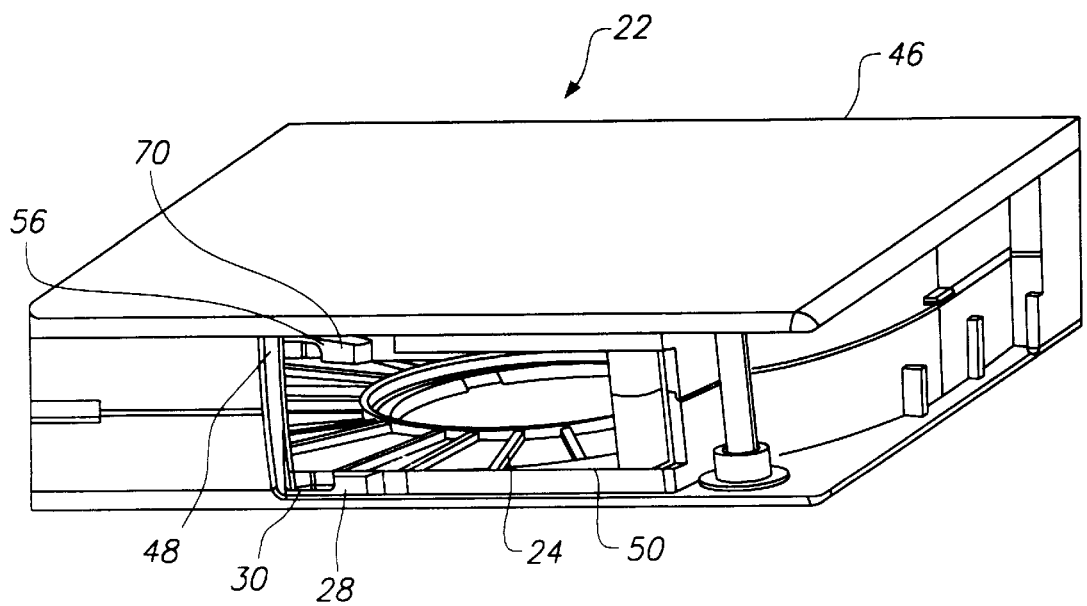
FIG. 4 is a perspective view of a cartridge having features of the present invention.

Referring to FIG. 4, the cartridge 22 includes a substantially rectangular cartridge housing 46 which encloses the cartridge reel 24 and the storage tape 26 (not shown in FIG. 4). The cartridge housing 46 includes a cartridge door (not shown for clarity) which pivots between an open door position in which the cartridge leader 28 is exposed and a closed door position. FIG. 4 illustrates that the cartridge housing 46 includes a cartridge stop 48 positioned near the cartridge reel 24 and a housing opening 50 in the cartridge housing 46. The cartridge stop 48 is sized and positioned to prevent the portion of buckle 30 which is attached to the cartridge leader 28 from retracting onto the cartridge reel 24. This maintains the buckle 30 outside the path of the storage tape 26 on the cartridge reel 24. Further, this ensures that buckling occurs away from the storage tape 26 to prevent damage to the storage tape 26.

Referring back to FIG. 2, the cartridge receiver 18 is positioned within the drive housing 12 and selectively receives the cartridge 22. The cartridge receiver 18 includes a protruding wall 52 which contacts the cartridge door (not shown) of the cartridge 22 during movement of the cartridge 22 in the cartridge receiver 18. This causes the cartridge door to move from the closed door position to the open door position.

The buckle 30 secures the drive leader 32 of the tape drive 10 to the cartridge leader 28 of the cartridge 22. The buckle 30 includes a first buckle component 54 attached to the drive leader 32 and a second buckle component 56 attached to the cartridge leader 28. The buckle 30 reliably and securely couple the cartridge leader 28 to the drive leader 32. This reduces the likelihood of leader runaway. Further, as provided herein, the buckle 30 is made of durable materials to increase the operational life of the buckle 30.

A number of alternate embodiments of the buckle 30 are illustrated in the FIGS. 5A–6B. Generally, in each embodiment illustrated, the first buckle component 54 includes a bar-shaped, buckle bar 58 which is secured to the drive leader 32. In the embodiments illustrated, the buckle bar 58 is a substantially straight piece of a rigid material, having a substantially circular cross section. The buckle bar 58 extends transversely across the drive leader 32. The buckle bar 58 preferably has a bar length 60 which is greater than a leader width 62 of the drive leader 32. Because the bar length 60 is greater than the leader width 62, the buckle bar 58 has a pair of bar ends 64 which cantilever past opposed edges 65 of the drive leader 32. Stated another way, the buckle bar 58 includes a first bar section 66 which extends away from one of the leader edges 65 and a second bar section 68 which extends away from the other leader edge 65 of the drive leader 32.

In each embodiment illustrated, the second buckle component 56 includes a pair of spaced apart bar receivers 70. Each bar receiver 70 is sized and shaped to receive a portion of one of the bar sections 66, 68 to couple the drive leader 32 to the cartridge leader 28. The use of two spaced apart bar receivers 70 ensures a reliable connection between the leaders 28, 32.

FIGS. 5A–5C and 5E–5G illustrate a first embodiment of the buckle 30. As can best be seen with reference to FIG. 5A, each of the bar ends 64 of the buckle bar 58 is spherical shaped. Further, in this embodiment, the bar receivers 70 are secured together with a connector bar 72, which is attached to the cartridge leader 28. In this embodiment, the bar receivers 70 are spaced apart a receiver distance 74 by the connector bar 72.

Preferably, the receiver distance 74 is longer than the leader width 62. This allows the bar receivers 70 to engage the cartridge stop 48 (FIG. 4) in the cartridge housing 46 to inhibit the cartridge leader 28 from being pulled back into the cartridge housing 46. Further, this keeps the buckle 30 away from the cartridge reel 24 and out of the path of the storage tape 26 to protect the storage tape 26.

In the embodiment illustrated in FIGS. 5A–5C and 5E–5G, each bar receiver 70 is sized and shaped to receive one of the bar ends 64. Each bar receiver 70 is defined by a substantially rectangular receiver housing 76. Each receiver housing 76 includes a channel 78 having a channel opening 80 and a channel end 82. During coupling, the buckle bar 58 is inserted into the channel opening 80. Subsequently, the buckle bar 58 is forced to slide in the channel 78 until the buckle bar 58 reaches the channel end 82.

Preferably, each channel 78 includes a bump 84 which projects into the channel 78 near the channel end 82. The bump 84 reliably holds the buckle bar 58 against the channel end 82. In the embodiment illustrated in the FIGS. 5A–5C and 5E–5G, each bump 84 is ramped shaped to facilitate movement over the bump 84. Alternately, for example, each bump 84 could be semi-circular shaped.

Each channel 78 is wide enough to receive the buckle bar 58. Further, the channels 78 are spaced apart so that a bottom of each channel 78 substantially contacts the bar ends 64 of the buckle bar 58 when the buckle bar 58 is placed in the channels 78.

Figure 5A:
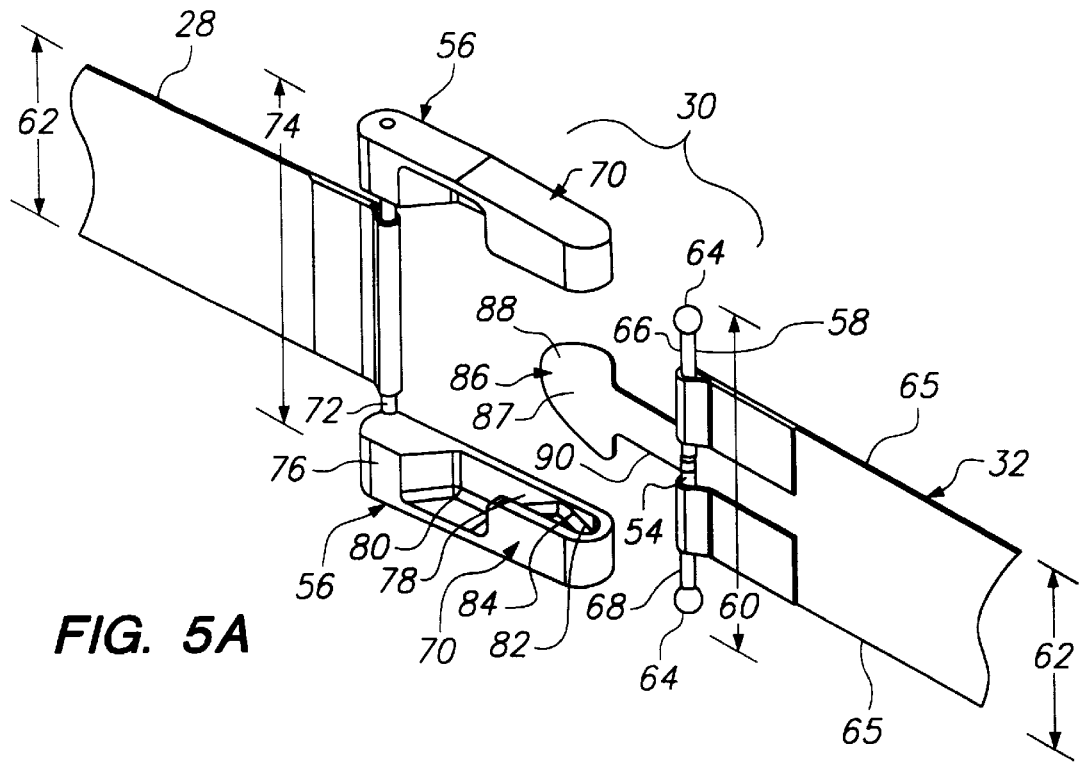
FIGS. 5A–5C are perspective views of a first embodiment of buckle during different stages of coupling.
Figure 5B:
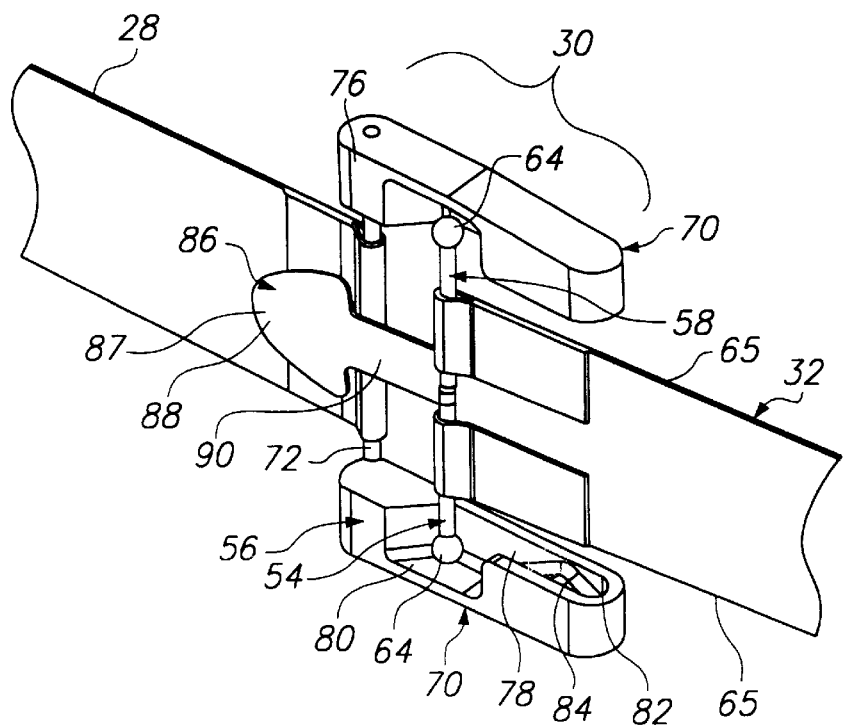
Figure 5C:
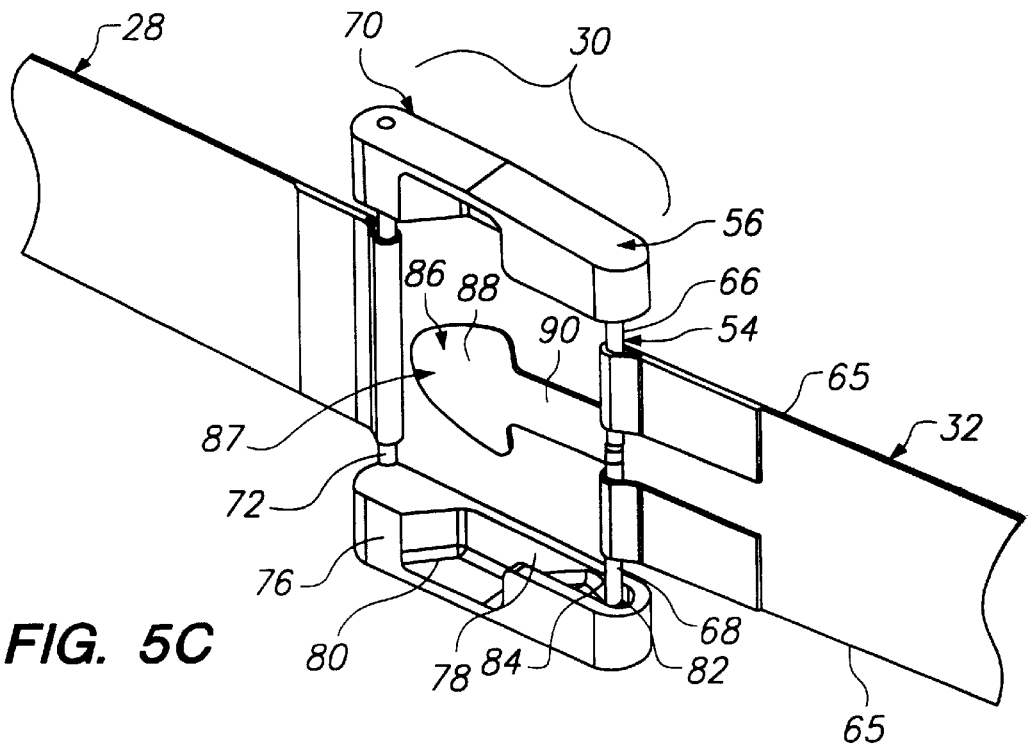
Figure 5D:
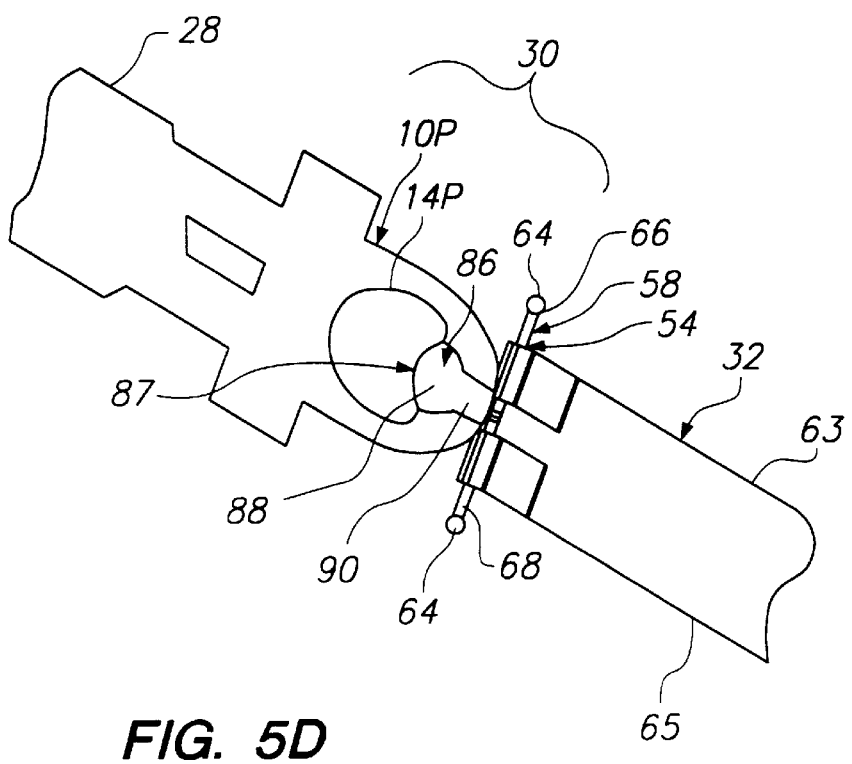
FIG. 5D is a perspective view of a portion of the buckle of FIG. 5A coupled to a prior art cartridge leader.
Figure 5E:
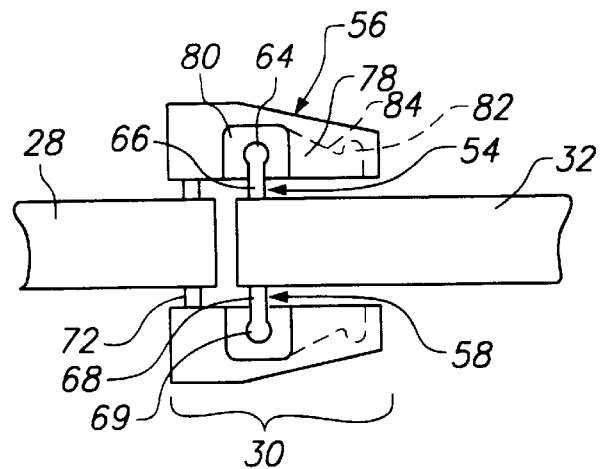
FIGS. 5E–5F illustrate the relative position of the buckle during different stages of coupling.
Figure 5F:
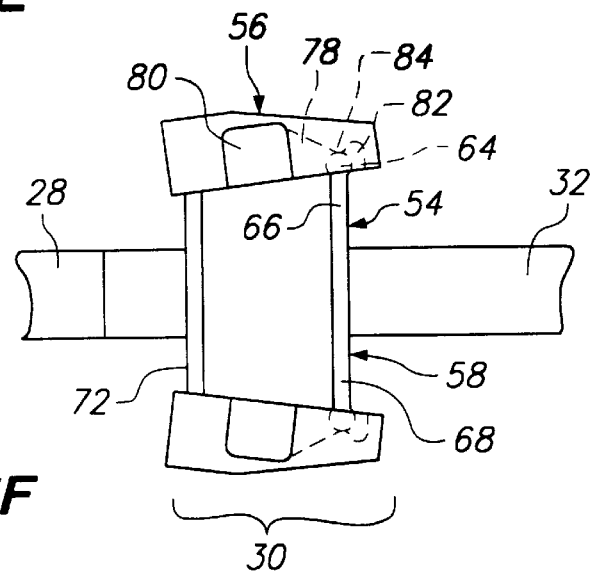
Figure 5G:
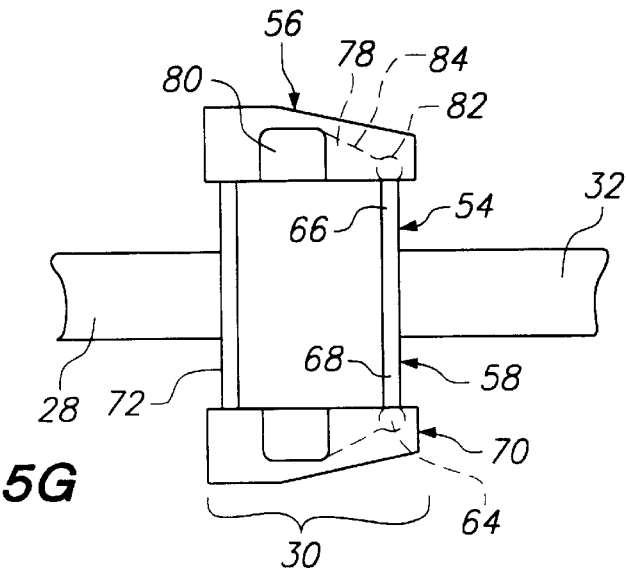

FIGS. 5E–5G illustrate the interaction between the first and second buckle components 54, 56 during the buckling process. In particular, referring to FIG. 5F, the bar receivers 70 and the connector bar 72 can flex to allow the buckle bar 58 to pass over the bumps 84. The flex illustrated in FIG. 5F is exaggerated to facilitate this discussion.

Preferably, the drive leader 32 is also compatible with one or more prior art cartridges 26P. Stated another way, the drive leader 32 is preferably designed to be compatible with two or more different styles of cartridges. For example, the drive leader 32 can include an additional buckle component 86 which allows the drive leader 32 to couple to a prior art cartridge. In the embodiment illustrated in FIG. 5D, the additional buckle component 86 projects away from a distal end of the drive leader 32. In this embodiment, the additional buckle component 86 is a mushroom shaped tab 87 which is adapted to engage a hoop 14P and a notch 16P of a prior art cartridge leader 10P. The additional buckle component 86 includes a nose 88 which is dimensioned to fit through the hoop 14P but not the notch 16P. The additional buckle component 86 also includes a neck 90 which is designed to fit in both the hoop 14P and notch 16P. Thus, the additional buckle component 86 allows the tape drive 10 and the drive leader 32 to also be compatible with old style cartridges 26P.

Figure 6A:
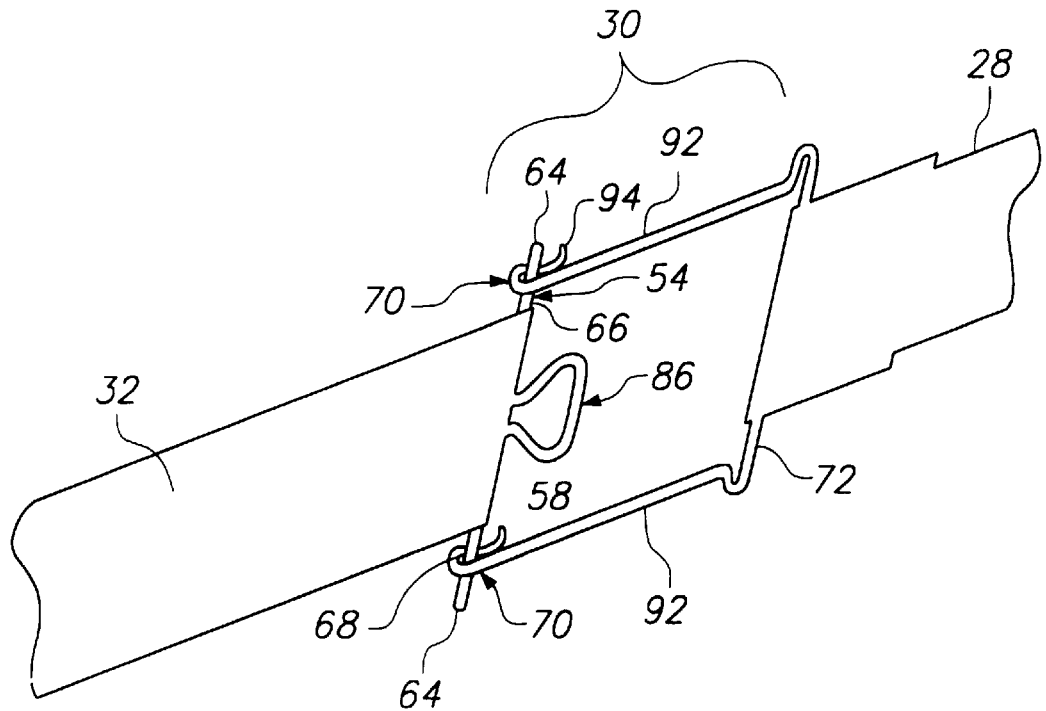
FIG. 6A is a perspective view of another embodiment of a buckle having features of the present invention.

FIG. 6A illustrates another embodiment of the buckle 30. Similar to the embodiments provided above, the buckle bar 58 is elongated, bar shaped and includes a pair of opposed bar ends 64. In this embodiment, the spaced apart bar receivers 70 are again secured together with a connector bar 72 which is secured to the cartridge leader 28. Again, the bar receivers 70 are spaced apart sufficiently to engage the cartridge stop 48 (illustrated in FIG. 4) in the cartridge housing 46 to inhibit the cartridge leader 28 from being pulled back into the cartridge housing 46.

In the embodiment illustrated in FIG. 6A, the connector bar 72 and the bar receivers 70 are made as a uniform second buckle component 56. The second buckle component 56 includes the relatively straight connector bar 72 with a pair of receiver bars 92 extending generally transversely to the connector bar 72. Each bar receiver 70 is positioned at a distal end of each connector bar 72. In this embodiment, each bar receiver 70 is a clasp which is sized and shaped to receive a portion of the buckle bar 58. Each clasp is hook shaped and substantially encircles a portion of one of the bar sections 66, 68. A distal end 94 of each clasp includes an outwardly protruding lip which curves away from the receiver bar 92 to facilitate placement of the bar section 66, 68 within the clasp. In this embodiment, the bar receivers 70 are made of a spring like material having a circular cross section.

Figure 6B:
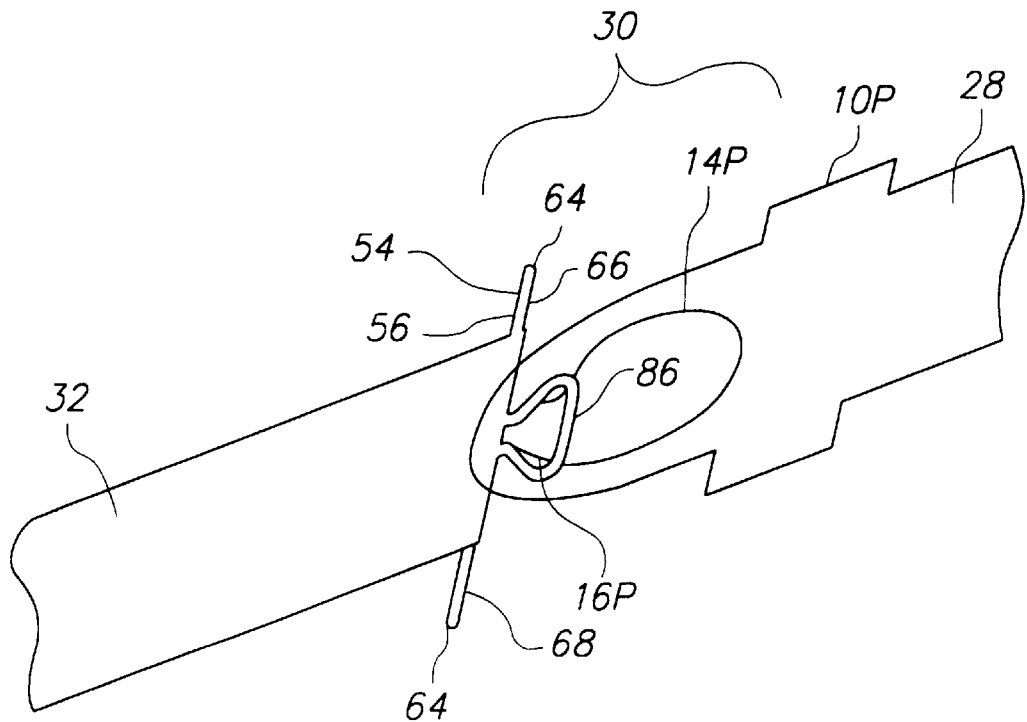
FIG. 6B is a perspective view of a portion of a buckle coupled to a prior art cartridge leader.

As illustrated in FIG. 6B, the drive leader 32 preferably also includes the additional buckle component 86 which projects away from the distal end of the drive leader 32. The additional buckle component 86 engages a prior art cartridge leader 10P and allows the tape drive 10 and the drive leader 32 to be compatible with prior art cartridges 26P. In this embodiment, the additional buckle component 86 is formed from the same wire as the buckle bar 58.

The buckler 20 moves relative to the cartridge receiver 18 to couple and uncouple the buckle 30. More specifically, the buckler 20 selectively retains and moves the drive leader 32 to couple drive leader 32 to the cartridge leader 28. In the embodiment illustrated in the Figures, the buckler 20 selectively retains the drive leader 32 at the buckle bar 58. Referring to FIGS. 7A–9, the buckler 20 includes a pair of spaced apart buckler retainers 96 which selectively retain the buckle bar 58 (illustrated in FIG. 9). More specifically, each buckler retainer 96 selectively engages one of the bar sections 66, 68 to selectively retain and move the drive leader 32.

In the embodiment illustrated in the Figures, the buckler 20 is positioned near a back of the cartridge receiver 18 and rotates relative to the cartridge receiver 18 on a buckler pin 98. The buckler pin 98 is fixedly mounted to the base 40 of the drive housing 12. The buckler 20 includes a first component 100, a second component 102, a connector pin 104, a connector spring 106, and a buckler spring 108.

Referring to FIGS. 7A–9, the first component 100 includes a tube shaped section 110 which pivots on the buckler pin 98. An upper arm 112 and a spaced apart, lower arm 114 which cantilever away from the tube shaped section 110 and rotate with the tube shaped section 110. A buckler cam 115 cantilevers away from the lower arm 114. The buckler cam 115 interacts with a ring cam 138. Movement of the ring cam 138 causes the ring cam 138 to engage the buckler cam 115 to rotate the first component 100 around the buckler pin 98 (illustrated in FIGS. 14A–14D).

Figure 7A:
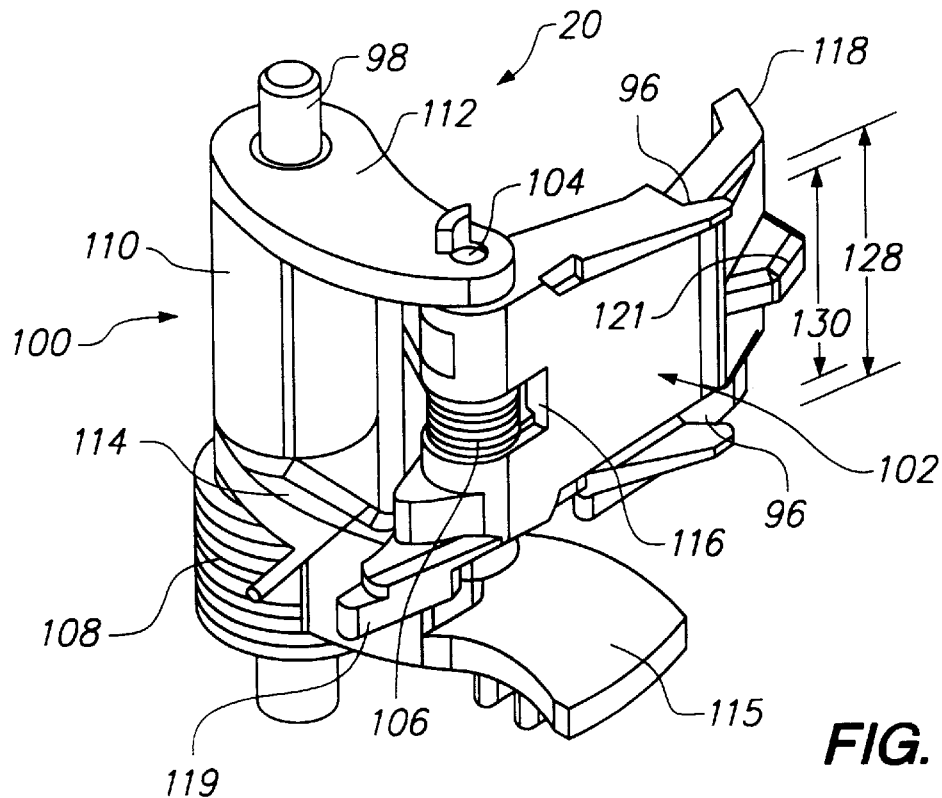
FIGS. 7A and 7B are perspective views of a buckler having features of the present invention.
Figure 7B:
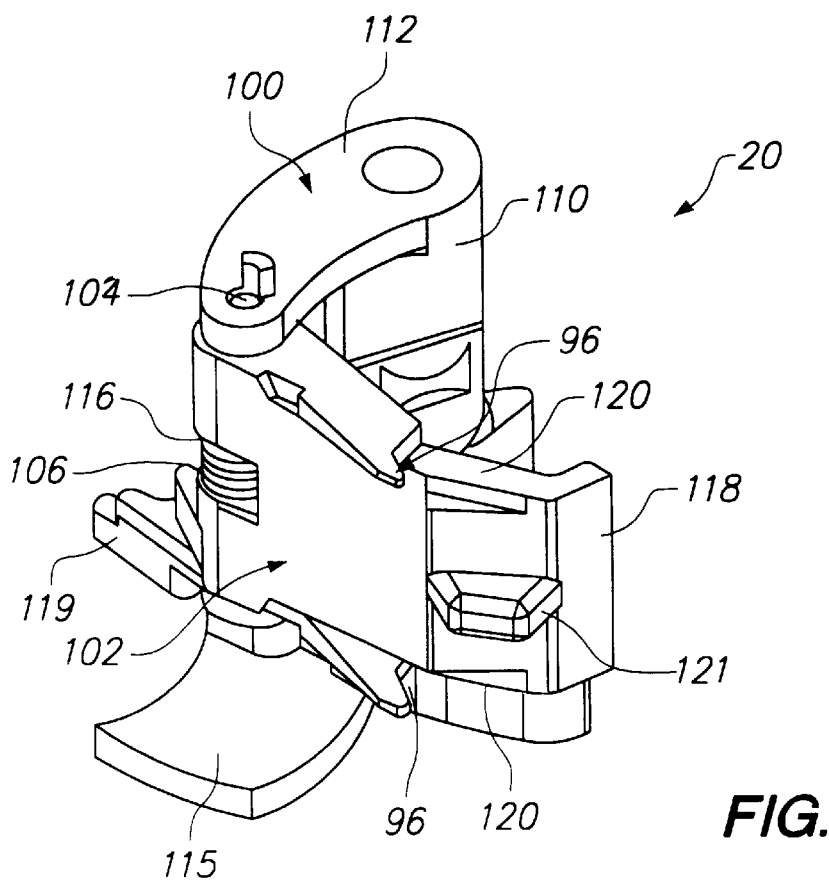
Figure 8:
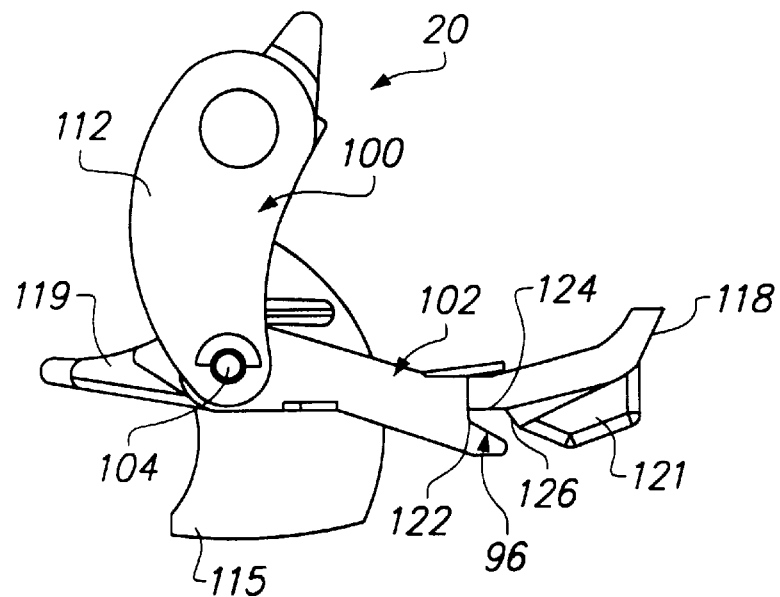
FIG. 8 is a top plan view of the buckler of FIG. 7A and 7B.
Figure 9:
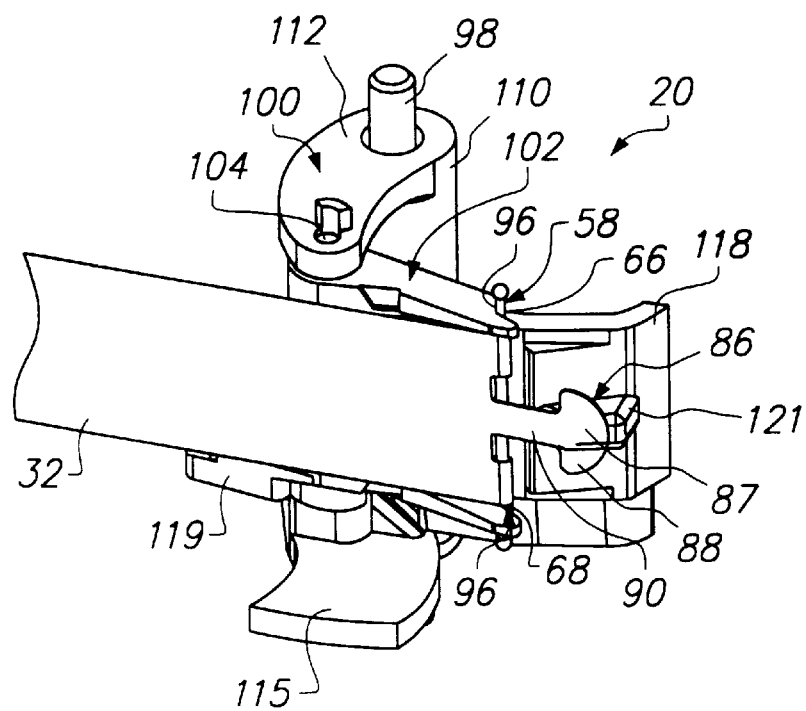
FIG. 9 is a perspective view of the buckler of FIG. 7A and 7B and a portion of a buckle.

As best can be seen with reference to FIG. 7A, the buckler spring 108 is coiled around buckler pin 98. Additionally, the buckler spring 108 is connected to the first component 100 and the base 40. The buckler spring 108 is biased to cause the buckler 20 to rotate in a counter-clockwise direction towards the cartridge receiver 18. This causes the buckler 20 to be biased to rotate towards the cartridge receiver 18.

The second component 102 is attached to, cantilevers away from and rotates relative to the first component 100 on the connector pin 104. More specifically, the connector pin 104 extends through apertures in the upper arm 112, lower arm 114 and a proximal end of the second component 102 to connect the second component 102 to the first component 100. The proximal end of the second component 102 includes a gap 116 which allows the connector spring 106 to encircle the connector pin 104. The connector spring 106 is connected to the first component 100 and the second component 102. The connector spring 106 is biased to cause the second component 102 to rotate relative to the first component 100 in a clockwise direction away from the buckler pin 98. Stated another way, the connector spring 106 is biased to inhibit the second component 102 from folding towards the first component 100.

A distal end of the second component 102 includes a tapered lip 118 to protect the storage tape 26 from the buckler 20. Additionally, a buckler tab 119 extends and cantilevers from the proximal end of the second component 102. The buckler tab 119 interacts with a buckler stop 117 (illustrated in FIGS. 10C, 10D, 14A–14D) and causes the second component 102 and the buckler retainers 96 to move away from the drive leader 32. Stated another way, the interaction between the buckler tab 119 and the buckler stop 117 causes the second component 102 to fold towards the first component 100 and the buckler pin 98.

The spaced apart buckler retainers 96 extend away from opposed edges 120 of the second component 102 intermediate the distal end and the proximal end of the second component 102. The design of the buckler retainers 96 can be varied. In the embodiment illustrated in the Figures, the buckle retainers 96 are designed to engage the buckle bar 58 at each bar section 66,68. As can best be seen with reference to FIG. 8, each buckle retainer 96 includes a channel shaped opening which is formed with a rear surface 122, a bottom surface 124 and a front surface 126. As illustrated in FIG. 7A, the outer edges of the buckle retainers 96 are spaced apart a buckler retainer outer distance 128 which is less than the bar length 60 and the receiver distance 74. The inner edges of the buckler retainers 96 are spaced apart a buckler retainer inner distance 130 which is greater than the leader width 62. This allows the buckler retainers 96 to be positioned near the leader edges 65 to retain the buckle bar 58.

Additionally, the second component 102 can include a buckler protrusion 121 which extends away from the second component 102 between the buckler retainers 96 and the tapered lip 118. The buckler protrusion 121 10 facilitates buckling with a prior art cartridge 26P and cartridge leader 10P. More specifically, referring to FIGS. 9 and 13A, the buckler protrusion 121 supports the tab 87 of the additional buckle component 86 and eliminates the need for a mushroom cam (not shown) which was used in prior art devices. Basically, the buckler protrusion 121 holds the tab 87 outward and in the correct position. This allows the hoop 14P of a prior art cartridge leader 10P to fit around the tab 87 during insertion of the cartridge 26P in the cartridge receiver 18.

Figure 10A:
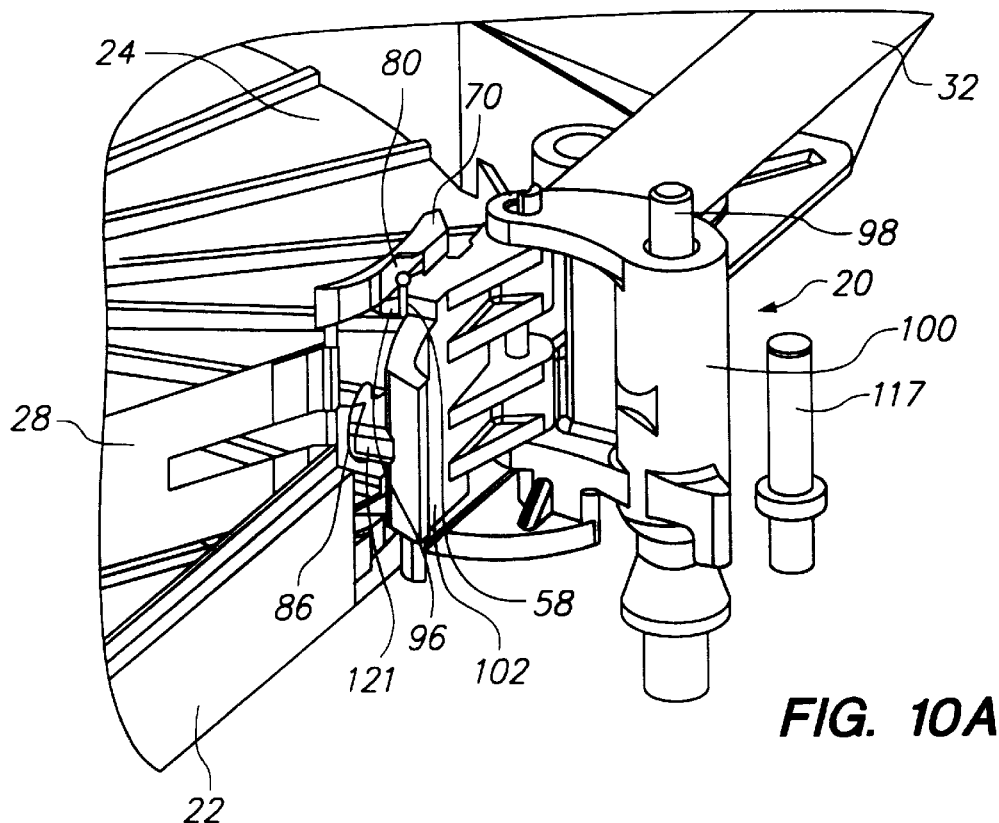
FIGS. 10A–10D illustrate a rear perspective view of the buckler, a portion of a cartridge, a drive leader and a cartridge leader during alternate stages of coupling.
Figure 10B:
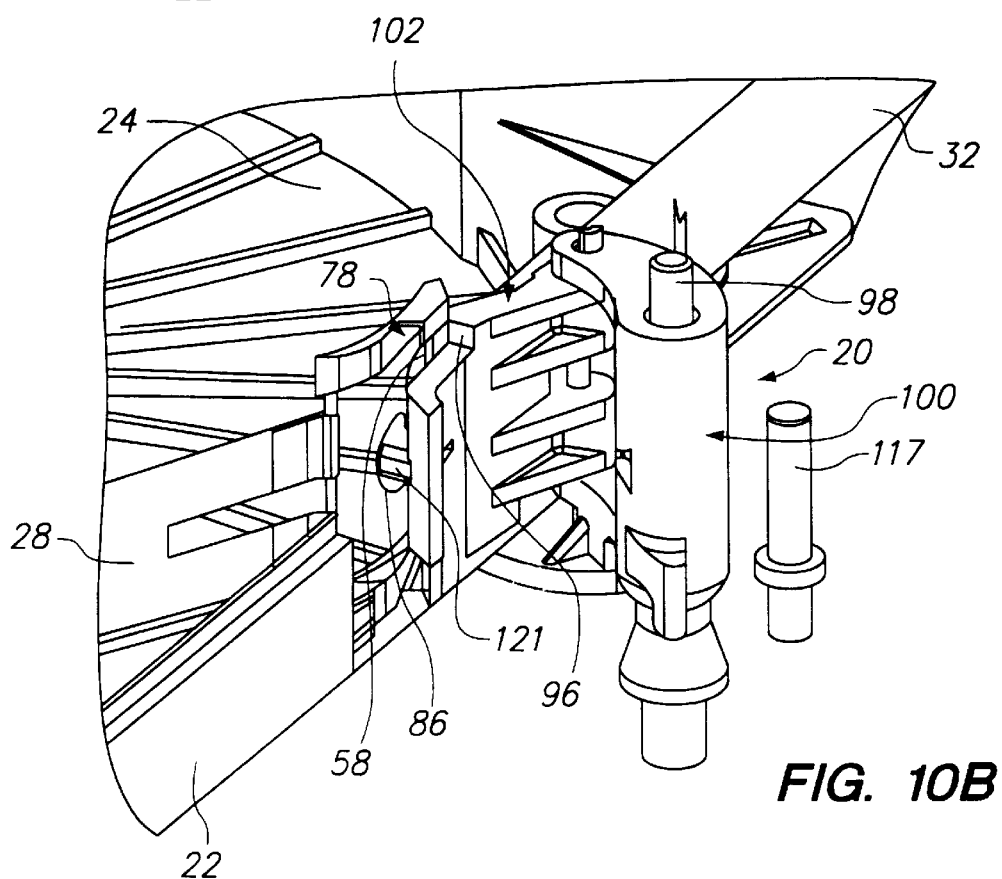
Figure 10C:
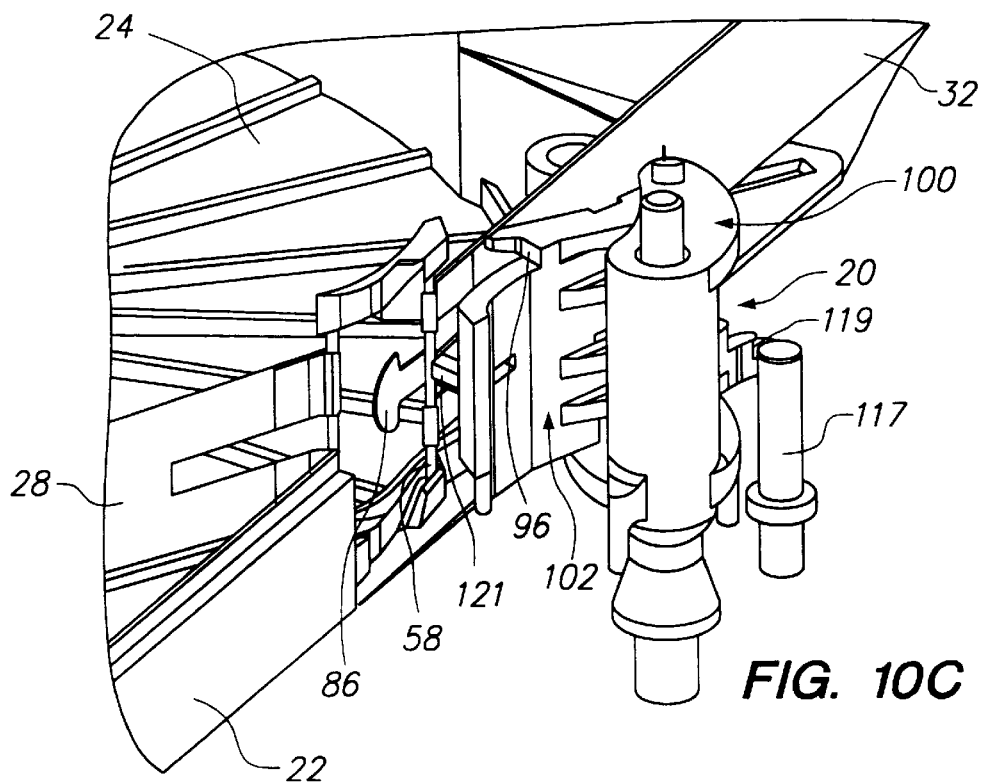
Figure 10D:
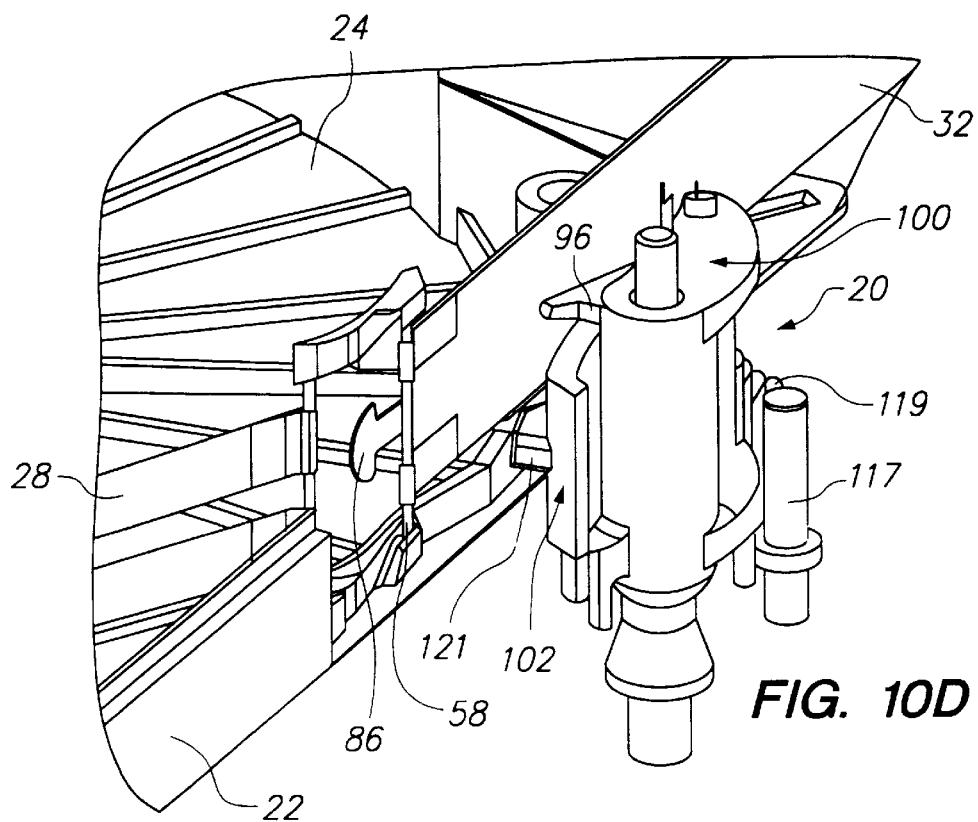

The interaction between the buckler retainers 96 and the buckle bar 58 during coupling and uncoupling can best be understood with reference to FIGS. 10A–12. In particular, FIGS. 10A–10D sequentially illustrate a rear perspective of the buckler 20, a portion of the cartridge 22, the drive leader 32 and cartridge leader 28 during buckling. In particular, FIG. 10A illustrates the buckler 20 initially holding the buckle bar 58 so that the channel openings 80 of the bar receivers 70 slide over the buckle bar 58 when the cartridge 22 is inserted into the cartridge receiver 18. FIG. 10B illustrates the buckler 20 rotating in a counter-clockwise direction away from the cartridge receiver 18 to pull the buckle bar 58 in each channel 78. FIG. 10C illustrates the buckler 20 partly rotated away from the drive leader 32. FIG. 10D illustrates the buckler 20 after it is rotated away from the drive leader 32 out of the path of the storage tape 26. Importantly, as illustrated in FIG. 10C and 10D, the buckler tab 119 contacts the buckler stop 117 so that rotation of the buckler 20 causes the second component 102 to rotate towards the first component 100 to fold the buckler 20 and to disengage from the buckle bar 58. Further, this causes the buckler 20 to rotate away from the path of the storage tape 26.

Figure 11:
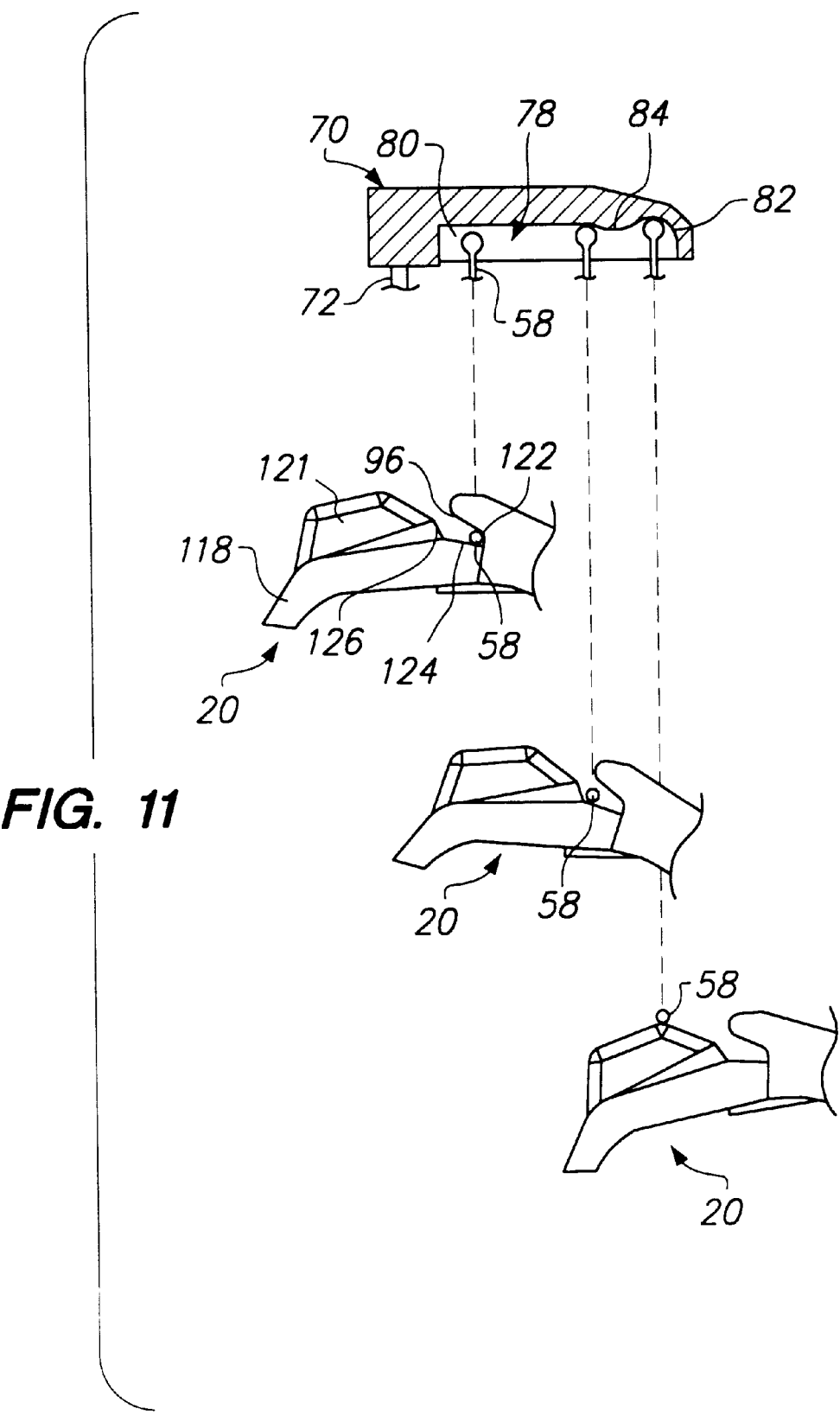
FIG. 11 illustrates the interaction between the buckler and the buckle during the buckle process.

FIG. 11 illustrates the relative position of the buckler 20 and the buckle bar 58 during alternate stages of buckling. In particular, the buckle bar 58 is initially in contact the rear and bottom surfaces 122, 124 of each buckle retainer 96. In this position, the buckle bar 58 is ready to slide into the channel openings 80 of the bar receivers 70 when the cartridge 22 is inserted into the cartridge receiver 18. Next, rotation of the buckler 20 causes the buckle bar 58 to contact the front and bottom surfaces 126, 124 of each buckler retainer 96. Subsequent movement of the buckler 20 causes the buckler retainers 96 to pull the buckle bar 58 in the channels 78 past the bumps 84 to the channel ends 82. Subsequently, the buckler retainers 96 are moved away from the buckle bar 58 and the path of the storage tape 26.

Figure 12:
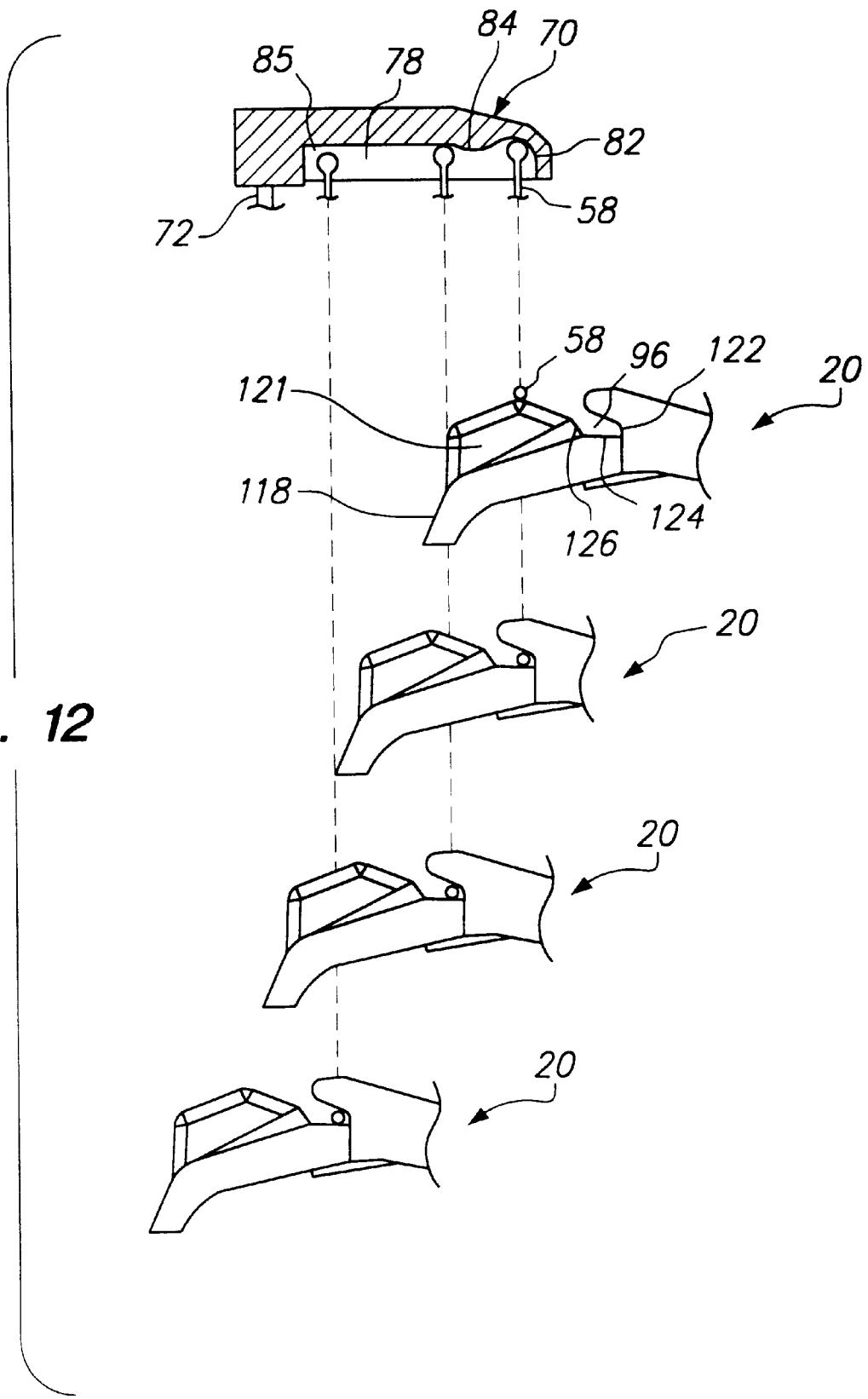
FIG. 12 illustrates the interaction between the buckler and the buckle during the unbuckling process.

FIG. 12 illustrates the relative position of the buckler 20 and the buckle bar 58 during alternate stages of unbuckling.

During the unbuckling process, rotation of the buckler 20 causes the buckler protrusion 121 to initially contact the buckle bar 58. Next, additional movement of the buckler 20 causes the rear and bottom surfaces 122, 124 to contact the buckle bar 58 and move the buckle bar 58 past the bumps 84 and to the channel openings 80 of each bar receiver 70. In this position, the cartridge 22 can be removed from the cartridge receiver 18.

Figure 13A:
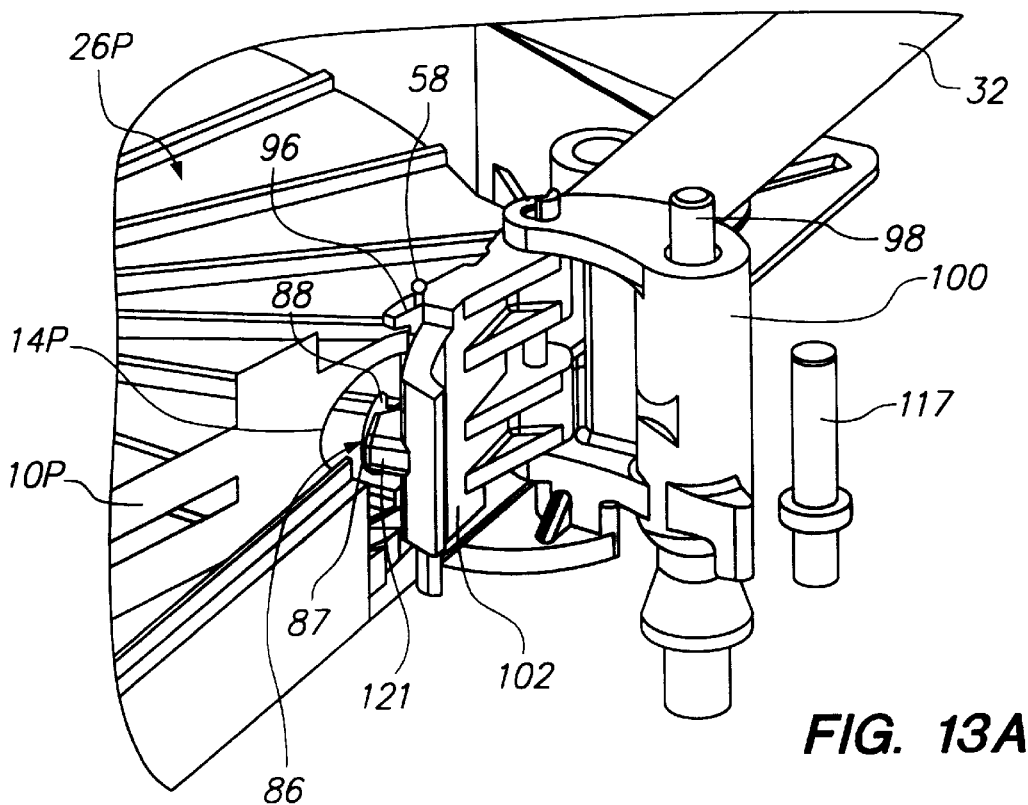
FIGS. 13A–13B illustrate a rear perspective view of the buckler, a portion of a prior art cartridge, the drive leader and a prior art cartridge leader during alternate stages of coupling.
Figure 13B:
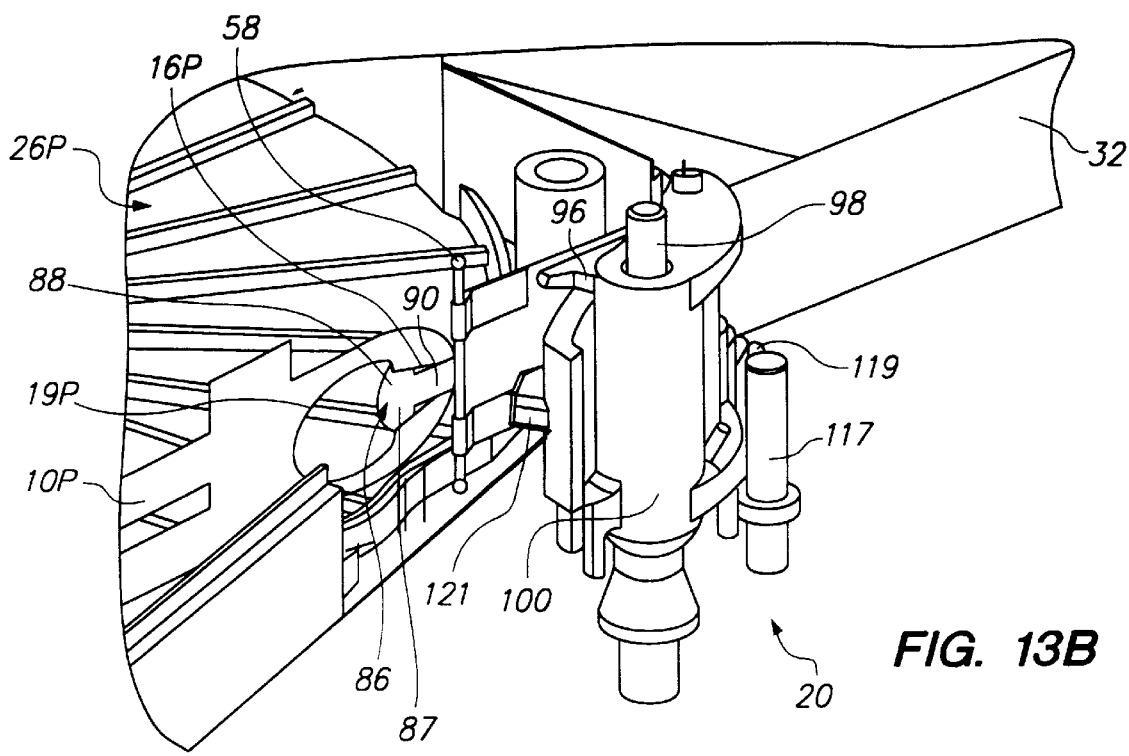

FIGS. 13A and 13B sequentially illustrate a rear perspective view of the buckler 20, a portion of a prior art cartridge 26P, the drive leader 32 and a prior art cartridge leader 10P during buckling. In particular, FIGS. 13A and 13B illustrate the present buckler 20 used with the additional buckle component 86 to couple the drive leader 32 to the prior art cartridge leader 10P. FIG. 13A highlights that the buckler protrusion 121 supports the nose 88 of additional buckle component 86. This allows the nose 88 to fit within the hoop 14P of the prior art cartridge leader 10P when the cartridge 26P is inserted into the cartridge receiver 18. Subsequently, as illustrated in FIG. 13B, the buckler tab 119 of the buckler 20 is rotated against the buckler stop 117. This causes the second component 102 to rotate towards the first component 100 and move out of the way of the path of the storage tape 26.

As discussed above, rotation of the buckler 20 causes the buckler 20 to couple and decouple the drive leader 32 to the cartridge leader 28. In the embodiments illustrated in the Figures, the buckler 20 is rotated around the buckler pin 98 by a buckler motor 132 (illustrated in FIG. 2). The design of the buckler motor 132 can be varied. For example, the buckler motor 132 illustrated is a small electric motor mounted to the drive housing 12.

In order to precisely move the buckler 20, the buckler motor 132 is mechanically linked to the buckler motor 132 with a gear train (not shown) and a load ring 134. Basically, the gear train includes a plurality of gears which reduce rotation in the load ring 134 relative to the rotation of the buckler motor 132. Thus, a relatively large amount of rotation in the buckler motor 132 is reduced by the gear train to a relatively small amount of rotation to the load ring 134. The load ring 134 is positioned below and rotates relative to the cartridge receiver 18.

FIGS. 14A–14D, illustrate the interaction between the load ring 134, the buckler 20, and the buckler stop 117 without the rest of the tape drive 10. The load ring 134 is coupled to the buckler 20 and the buckler motor 132, so that rotation of the buckler motor 132 results in rotation of the load ring 134 and the buckler 20 relative to the cartridge receiver 18. In the embodiment illustrated in FIGS. 14A–14D, the load ring 134 is disk shaped and includes a plurality of load ring teeth 136, and a ring cam 138, which are positioned around and extend away a circumference of the load ring 134. The load ring teeth 136 mesh with the teeth of the gear train so that rotation of the gear train results in rotation of the load ring 134.

Figure 14A:
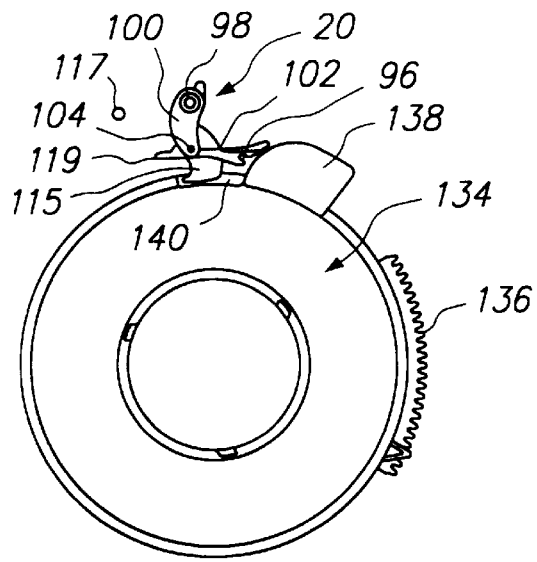
FIGS. 14A–14D illustrate the interaction between a load ring, a buckler and a buckler stop during alternate stages of coupling.
Figure 14B:
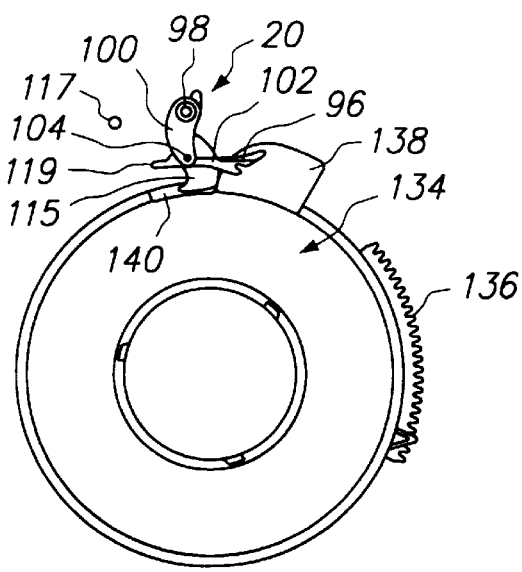
Figure 14C:
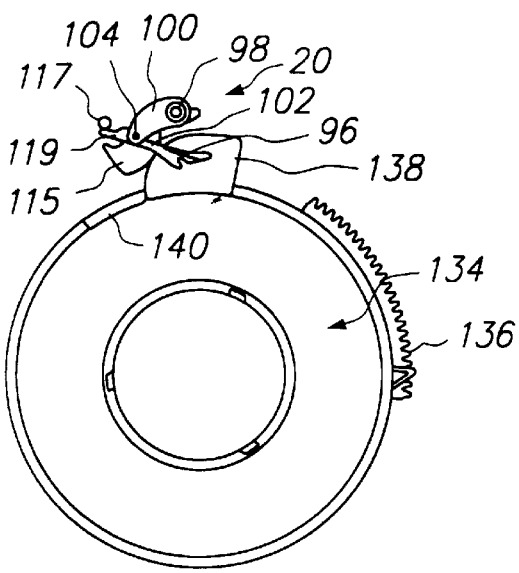
Figure 14D:
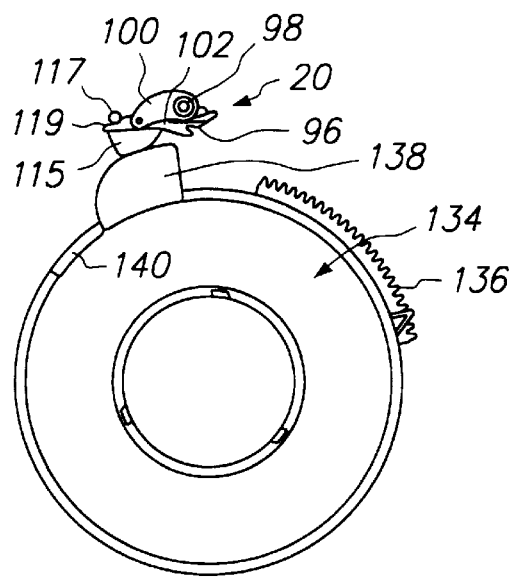

As illustrated in FIG. 14A, the buckler 20 is initially retained in a locked position by a lock notch 140 on the load ring 134. Additionally, in this position, the buckler spring 108 urges the first component 100 towards the load ring 134. Somewhat similarly, the connector spring 106 urges the second component 102 away from the buckler pin 98. Referring to FIGS. 14B–14D, rotation of the load ring 134 in the counter-clockwise direction results in interference between the ring cam 138 and the buckler cam 115 of the buckler 20. This causes rotation of the buckler 20 against the urging of the buckler spring 108 and engagement of the drive leader 32 and the cartridge leader 28. Additional rotation of the buckler 20 causes the buckler tab 119 to engage the buckler stop 117. This results in the second component of the buckler 20 rotating away from the buckle bar 58 and the second component 102 folding, against the urging of the connector spring 106 towards the first component 100.

Operation of one embodiment of the buckler 20 can probably best be understood with reference to FIGS. 2 and 10A–10D. Initially, the cartridge 22 is inserted into the cartridge receiver 20. Insertion of the cartridge 22 causes the cartridge door to rotate to the open position. When the cartridge 22 is inserted, the buckle bar 58 is positioned within the channel openings 80 of the channels 78 (see FIG. 10A). Next, the buckler motor 132 rotates the buckler 20. This causes the buckle bar 58 to slide in the channels 78 over the bumps 84 and against the channel ends 82 of the bar receivers 70 (see FIG. 10B). In this position, the buckle 30 is securely coupled. Additional movement of the buckler 20 causes the buckler tab 119 to engage the buckler stop 117 to move the buckler retainers 96 away from the buckle bar 58 (see FIGS. 10C–10D).

After the leaders 28, 32 are coupled, rotation of the take-up reel 16 results in movement of the storage tape 26 from the cartridge reel 24 past the data transducer 14 to the take-up reel 16.

Subsequently, during the eject cycle, rotation of the buckler 20 causes the buckler tab 119 to move away from the buckler stop 117. This allows the connector spring 106 to rotate the second component 102 away from the buckler pin 98 and buckler retainers 96 to engage the buckle bar 58 on the drive leader 32. Next, additional rotation of the buckler 20 moves and forces the buckle bar 58 over bumps 84 to the channel openings 80. Importantly, the buckler spring 108 facilitates the rotation of the buckler 20 and causes the buckler 20 to move towards the cartridge receiver 18 and into the lock notch 140 of the load ring 134. Finally, the cartridge 22 can be removed from the cartridge receiver 18.

While the particular tape drive 12, and buckler 20 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A tape drive which is adapted for use with a cartridge, the cartridge including a storage tape having a cartridge leader, the tape drive comprising:

a cartridge receiver which receives the cartridge;

a take-up reel including a drive leader, the drive leader being adapted to engage the cartridge leader to couple the storage tape to the take-up reel; and a buckler including a pair of spaced apart buckler retainers, the buckler retainers being adapted to selectively retain the drive leader to couple the drive leader to the cartridge leader.

2. The tape drive of claim 1 wherein the drive leader includes a bar shaped buckle bar and the buckler selectively retains the buckle bar.

3. The tape drive of claim 2 wherein the buckle bar includes a first bar section and a spaced apart second bar section which cantilever transversely from opposed leader edges of the drive leader and the buckler is adapted to selectively retain the first bar section and the second bar section.

4. The tape drive of claim 3 wherein each buckler retainer is adapted to selectively engage one of the bar sections.

5. The tape drive of claim 1 wherein the buckler retainers are spaced apart a buckler retainer distance which is greater than a leader width of the drive leader.

6. The tape drive of claim 1 including a buckler stop secured to the tape drive; wherein the buckler includes a buckler tab which interacts with the buckler stop and causes the buckler to disengage from the drive leader.

7. The tape drive of claim 1 wherein the drive leader includes an additional buckle component and the buckler includes a buckler protrusion which supports the additional buckle component.

8. A tape drive adapted for use with a cartridge, the cartridge including a storage tape having a cartridge leader, the cartridge leader including a pair of spaced apart bar receivers, the tape drive comprising:
   a cartridge receiver which receives the cartridge;
   a take-up reel;
   a drive leader connected to the take-up reel, drive leader including a bar shaped buckle bar which is sized and shaped to engage the bar receivers to couple the drive leader to the cartridge leader, the buckle bar including a pair of bar ends which cantilever transversely from opposed leader edges of the drive leader; and
   a buckler which selectively retains the drive leader, the buckler being adapted to move the drive leader relative to the bar receivers to couple the drive leader to the cartridge leader.

9. The tape drive of claim 8 wherein the buckler includes a buckler retainer which selectively engages the buckle bar.

10. The tape drive of claim 8 wherein the buckler includes a pair of spaced apart buckler retainers, each buckler retainer selectively engaging the buckle bar.

11. The tape drive of claim 8 including a buckler stop secured to the tape drive; wherein the buckler includes a buckler tab which interacts with the buckler stop and causes the buckler to disengage from the drive leader.

12. The tape drive of claim 8 wherein the drive leader includes an additional buckle component and the buckler includes a buckler protrusion which supports the additional buckle component.

13. A combination comprising:
   a cartridge including a cartridge leader;
   a tape drive including a drive leader;
   a buckle which secures the drive leader of the tape drive to the cartridge leader of the cartridge, the buckle including (i) a first buckle component secured to one of the leaders, the first buckle component including a buckle bar, the buckle bar including a pair of bar ends which cantilever transversely from opposed leader edges; and (ii) a second buckle component secured to the other one of the leaders, the second buckle component being adapted to engage the buckle bar to couple the drive leader to the cartridge leader; and
   a buckler which moves one of the buckle components relative to the other buckle component to engage the first buckle component to the second buckle component.

14. The combination of claim 13 wherein the buckler includes a buckler retainer which selectively engages the buckle bar.

15. The combination of claim 13 wherein the buckler includes a pair of spaced apart buckler retainers, each buckler retainer being adapted to selectively engage the buckle bar.

16. The combination of claim 13 including a buckler stop secured to the tape drive; wherein the buckler includes a buckler tab which interacts with the buckler stop and causes the buckler to disengage from the drive leader.

17. The tape drive of claim 13 wherein the drive leader includes an additional buckle component and the buckler includes a buckler protrusion which supports the additional buckle component.

18. A tape drive which is adapted for use with a cartridge, the cartridge including a storage tape having a cartridge leader, the cartridge leader including a hoop, the tape drive comprising:
   a cartridge receiver which receives the cartridge;
   a take-up reel including a drive leader, the drive leader including a tab which fits within the hoop to couple the storage tape to the take-up reel; and
   a buckler including (i) a pair of spaced apart buckler retainers adapted to selectively retain the drive leader and (ii) a buckler protrusion which contacts the tab to position the tab within the hoop.

19. The tape drive of claim 18 wherein the drive leader includes a bar shaped buckle bar and the buckler retainers selectively retain the buckle bar.

20. The tape drive of claim 19 wherein the buckle bar includes a first bar section and a spaced apart second bar section which cantilever transversely from opposed leader edges of the drive leader and the buckler is adapted to selectively retain the first bar section and the second bar section.

21. A method for buckling a cartridge leader of a cartridge to a tape drive, the method comprising the steps of:
   providing a tape drive including a cartridge receiver and a take-up reel, the cartridge receiver being adapted to receive the cartridge, the take-up reel including a drive leader adapted to engage the cartridge leader to couple the cartridge leader to the take-up reel, the drive leader including a pair of bar sections which cantilever transversely from opposed leader edges; and
   selectively retaining the drive leader with a buckler.

22. The method of claim 21 including the step of moving the buckler to selectively couple the drive leader to the cartridge leader.

23. The method of claim 21 wherein the step of retaining the drive leader includes the step of retaining the bar sections with a pair of spaced apart buckle retainers of the buckler.

24. A tape library adapted for use with a cartridge, the cartridge including a storage tape having a cartridge leader, the tape library comprising:
   a tape drive including (i) a cartridge receiver which receives the cartridge, (ii) a take-up reel including a drive leader, the drive leader being adapted to engage the cartridge leader to couple the storage tape to the take-up reel and (iii) a buckler including a pair of spaced apart buckler retainers, the buckler retainers being adapted to selectively retain the drive leader to couple the drive leader to the cartridge leader.

25. A tape library adapted for use with a cartridge, the cartridge including a storage tape having a cartridge leader, the cartridge leader including a pair of spaced apart bar receivers, the tape library comprising:
   a tape drive including (i) a cartridge receiver which receives the cartridge, (ii) a take-up reel, (iii) a drive leader connected to the take-up reel, drive leader including a bar shaped buckle bar which is sized and shaped to engage the bar receivers to couple the drive leader to the cartridge leader, the buckle bar including a pair of bar ends which cantilever transversely from opposed leader edges of the drive leader and (iv) a buckler which selectively retains the drive leader, the buckler being adapted to move the drive leader relative to the bar receivers to couple the drive leader to the cartridge leader.

* * * * *